C. MIKOLYN.
SPRING WHEEL.
APPLICATION FILED OCT. 21, 1918.
1,294,933.
Patented Feb. 18, 1919.
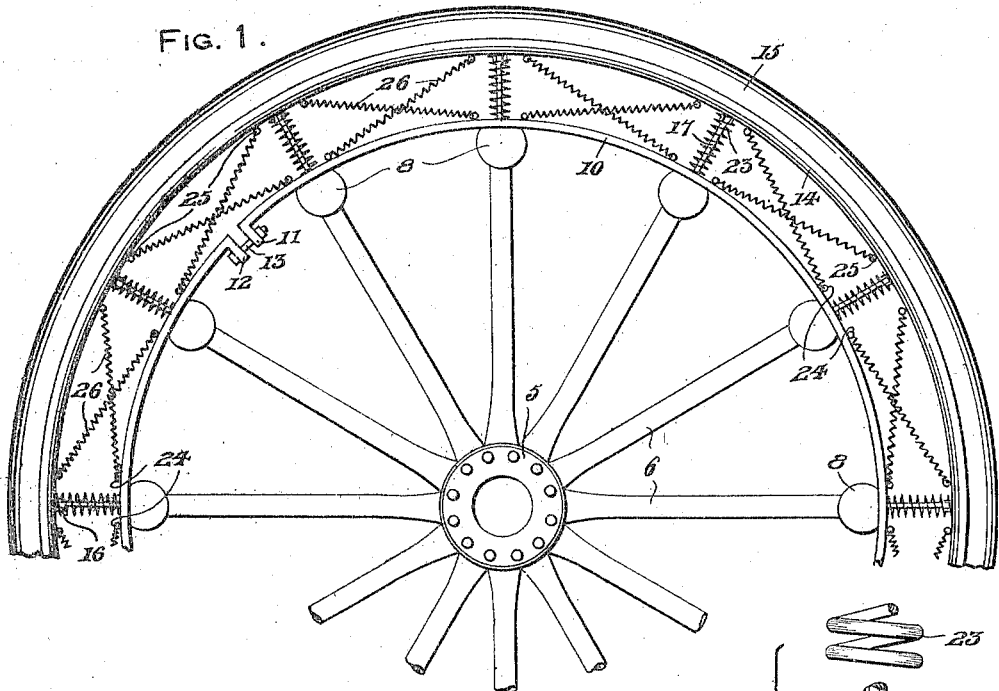
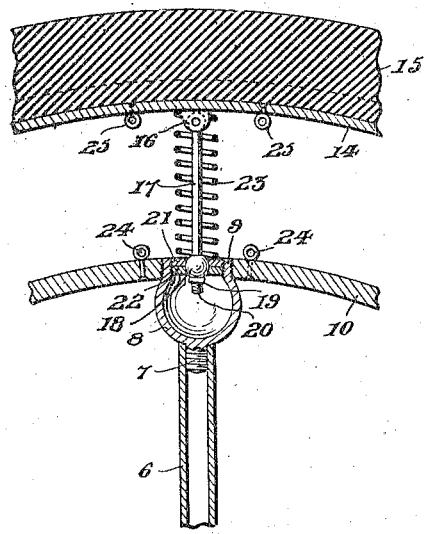
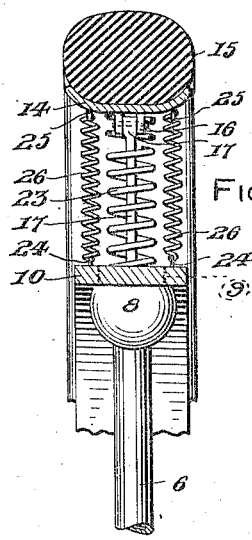
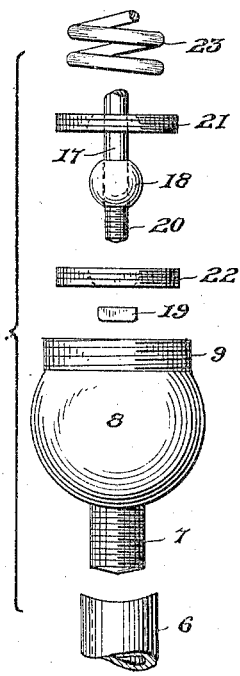
Inventor
C. Mikolyn
By A. M. Wilson
Attorney

UNITED STATES PATENT OFFICE.

CHARLEJ MIKOLYN, OF CHARLEROI, PENNSYLVANIA.

SPRING-WHEEL.

1,294,933.　　　　　Specification of Letters Patent.　　Patented Feb. 18, 1919.

Application filed October 21, 1918. Serial No. 259,047.

*To all whom it may concern:*

Be it known that I, CHARLEJ MIKOLYN, a Ukrainian, claimed as a subject of the Emperor of Austria, residing at Charleroi, in the county of Washington, and State of Pennsylvania, have invented certain new and useful Improvements in Spring-Wheels, of which the following is a specification.

This invention relates to certain new and useful improvements in spring wheels and has among its principal objects the provision of such type of device which is extremely durable although simple in construction and efficient in operation.

A further object of the invention is the provision of a spring wheel wherein an inner and an outer rim is provided with novel means between said rims for yieldingly maintaining the same in their proper concentric relation and for allowing any necessary relative movement between said rims when placed under load or torsional strains.

With the above general objects in view and others that will become apparent as the nature of the invention is better understood, the same consists in the novel form, combination and arrangement of parts hereinafter more fully described, shown in the accompanying drawing and claimed.

In the accompanying drawing wherein like characters refer to corresponding parts throughout the several views, Figure 1 is an elevational view of a portion of a vehicle wheel constructed in accordance with the present invention.

Fig. 2 is a central radial sectional view of a portion of the wheel, and illustrating novel details of the device.

Fig. 3 is a transverse sectional view of the device shown in Fig. 1 taken at a point between the spokes of the wheel, and Fig. 4 is a detail organization view illustrating the relative position of parts before being completely assembled.

Referring more in detail to the several views, the present invention embodies a wheel having any suitable form of hub 5 provided with radial rigid spokes 6 which are preferably of tubular form and internally threaded at their outer ends for reception of threaded studs 7 which are integral with and project from the bottoms of the somewhat spherical cup members 8. The cup members 8 are provided at their outer edges with internally and externally threaded flanges 9 which are screwed into suitable threaded openings provided in the inner rim 10 at points coincident with the spokes of the wheel. It will thus be seen that the cup members 8 form detachable but rigid connections between the inner rim 10 and the spokes 6, it being understood that the rim 10 is formed of flexible material so that the same may be expanded in order to assemble the parts. To allow such expansion of the rim 10, the ends 11 and 12 of the strip forming the same are detachably connected in any suitable manner as at 13. Surrounding the rim 10 in spaced relation thereto is a rigid rim 14 which is designed to carry any suitable form of solid cushion tire 15. The rim 14 is provided with inwardly extending ears 16 between each pair of which is pivoted the outer end of a link 17 which normally projects radially toward one of the spokes 6 as shown in Figs. 1 and 2. The inner end of each link 17 is slidably positioned through a ball member 18 and said ball member is retained upon the link by means of a suitable nut 19 screwed upon the threaded end 20 of said link. A two-part socket for each of the ball members 18 is provided comprising the sections 21 and 22 which are threaded into the flange 9 of each cup member 8, it being noted that the section 21 is placed upon the link 17 before the ball 18 is placed thereon in assembling the device.

The external threads upon the flange 9 of each cup member 8 are of an opposite pitch to those provided on the stud 7 and thus rotation of the cup 8 in one direction will cause screwing of the flange 9 into the rim 10 simultaneously with the screwing of the stud 7 into the spoke 6. Obviously, a reverse rotation of the cup 8 will cause simultaneous removal of the stud 7 from the spoke and flange 9 from the inner rim 10.

Surrounding each of the links 17 between the rims 10 and 14 is a helical spring 23, the opposite ends of which bear respectively against the inner face of the rim 14 and against the outer face of the socket section 21.

At opposite sides of the lugs or ears 16 eye members 24 are provided which are rigidly secured to the inner rim 10 to project outwardly therefrom, and similar eyes 25 are rigidly secured to the rim 14 to project inwardly toward the eyes 24. Crossed and diagonally arranged helical tension springs 26 are provided at opposite sides of the links 17 to extend across the space between adjacent ones of said links, each of said springs 26 having one end attached to an eye member 24 carried by the inner rim 10 and having its other end attached to an eye member 25 carried by the rim 14. These springs 26 constitute a positive and yieldable driving connection between the rims 10 and 14 and prevent undue pivotal motion of the links 17 so that circumferential movement of rim 14 relative to rim 10 is yieldingly limited.

In assembling the present device, the hub 5 and spokes 6 are in their operative relation and the rim 10 is placed in a position surrounding said spokes with the ends 11 and 12 of the rim 10 separated. With the rim 10 in this condition, the cup members may be successively placed in position and turned to screw into the rim 10 and spokes 6. When this is done, the ends 11 and 12 of the rim 10 are fastened and the rim 14 is disposed to surround the rim 10. The helical springs 23 are then placed upon the links 17, socket section 21 is subsequently placed on each link, and then the ball member 18 is slid onto said link where it is retained by the nut 19. As the nut 19 is sufficiently small to pass through the opening in the socket section 22, the links are disposed as shown in Fig. 2 and the sections 21 and 22 screwed into the cup flanges 9 so as to bring the sections 21 and 22 into intimate relation.

In operation, a displacement of the rim 14 relative to the rim 10 will cause the links 17 at one portion of the wheel to be moved to their outer limit of movement through the ball members 18 as shown in Fig. 2, while at other portions of the wheel, the links 17 will be slid inwardly through the respective ball members 18 thereof into the adjacent cup members 8. Such inward movement of the links 17 may occur when said links are inclined relative to the longitudinal axis of the spokes and in order to accommodate for reception of the links when pressed inwardly in this position, the cup members 8 are provided with outwardly bulged sides so as to give the same the general form of a sphere.

From the foregoing description, it will be seen that the present vehicle wheel is composed of a minimum number of small parts which may be readily assembled or renewed as required. It will also be seen that the several parts are retained in their operative relation in an effective manner and that the movable parts may be readily suitably lubricated to insure easy and proper action of the device.

It is believed that the construction and operation of the present invention will be readily understood from the foregoing description and while the form of the invention herein shown and described is what is believed to be the preferable embodiment thereof, it is nevertheless to be understood that minor changes may be made in the form, combination and arrangement of parts without departing from the spirit and scope of the invention as claimed.

What I claim as new is:—

1. A spring wheel comprising a hub provided with radial rigid spokes, an inner rim surrounding the spokes in concentric relation to the hub, substantially cup-shaped socket members detachably connected to each spoke and threaded through said rim, an outer rim concentric with and spaced from the inner rim having inwardly extending links pivoted thereto, each projecting within one of said cup-shaped socket members, sectional sockets screwed into said cup-shaped socket members, ball members within said sectional sockets, each having the inner end of one of said links slidably positioned therethrough, and helical compression springs surrounding said links between the inner and outer rims.

2. A spring wheel comprising a hub provided with radial rigid hollow spokes internally threaded at their outer ends, an inner rim surrounding said spokes and provided with openings therethrough coincident with the spokes, cup-shaped socket members having outer flanges threaded into the openings of the inner rim and provided with inwardly extending threaded studs screwed into the threaded outer ends of the hollow spokes, an outer rigid rim surrounding the inner rim in spaced relation to the latter, links pivotally carried by the outer rim and projecting inwardly therefrom, ball members slidably carried by said links, sectional sockets for said ball members removably carried by said cup-shaped socket members, and yieldable means interposed between the inner and outer rims to hold the same normally in concentric spaced relation.

In testimony whereof I affix my signature.

CHARLEJ MIKOLYN.